Figure 1:
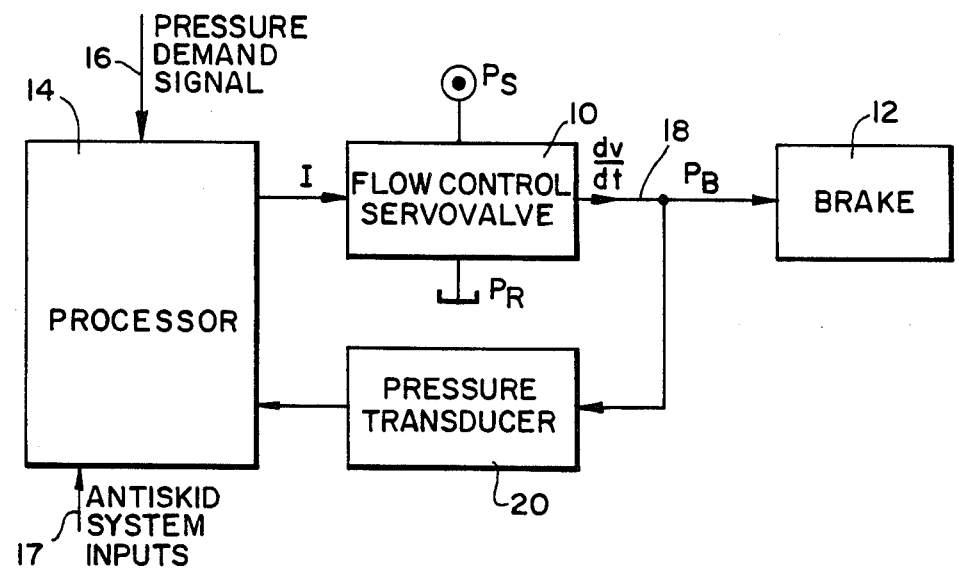

United States Patent [19]

Miller

[11] Patent Number: 4,775,195

[45] Date of Patent: Oct. 4, 1988

[54] HYDRAULIC SYSTEMS

[75] Inventor: Richard J. Miller, Coventry, England

[73] Assignee: Dunlop Limited, United Kingdom

[21] Appl. No.: 107,416

[22] Filed: Oct. 13, 1987

[30] Foreign Application Priority Data

Oct. 25, 1986 [GB] United Kingdom ................. 8625604

[51] Int. Cl.$^4$ ............................................... B60T 8/94
[52] U.S. Cl. ...................................... 303/92; 137/487; 303/DIG. 4
[58] Field of Search ............... 137/827, 829, 831, 458, 137/460, 487, 497; 303/20, 84 A, 84 R, 92, 112, DIG. 1-4

[56] References Cited

U.S. PATENT DOCUMENTS

| | | | |
|---|---|---|---|
| 3,509,528 | 4/1970 | Wiley | 303/DIG. 3 X |
| 3,671,082 | 6/1972 | Stevens | 303/DIG. 4 X |
| 4,061,155 | 12/1977 | Sopha | 137/487 X |
| 4,502,501 | 3/1985 | d'Agostino et al. | 137/487 |

Primary Examiner—Duane A. Reger
Attorney, Agent, or Firm—Stevens, Davis, Miller & Mosher

[57] ABSTRACT

A system for guarding against the leakage of fluid from a hydraulic system, particularly an aircraft braking system, which employs a flow control valve under the control of an electronic processor. The electronic processor integrates with respect to time a function of the input signal to the flow control valve and the pressure of the output of fluid, compares the value of the integrated function with a predetermined value, and effects closure of the control valve if the comparison indicates a substantial fluid loss.

4 Claims, 1 Drawing Sheet

HYDRAULIC SYSTEMS

This invention relates to hydraulic systems, and particulary to aircraft hydraulic braking systems.

A conventional aircraft braking system comprises a pilot's control valve which supplies fluid pressure to the brake operating mechanisms via an anti-skid valve which is subject to electrical control from a skid-sensing device. The anti-skid valve functions under its electrical control to supply fluid pressure to operate the brake and to return fluid to a reservoir when an incipient skid is sensed.

Essentially, the anti-skid valve in a conventional system operates as a pressure control servo-valve, i.e. the valve contains a hydraulic feed back loop which determines the pressure supplied to the brake operating cylinders in response to the output from the skid-sensing device.

In order to guard against the possible leakage of fluid e.g. from a burst hydraulic line between the anti-skid valve and the brake operating mechanism, it is usual practice to insert a 'hydraulic fuse' in this line. This hydraulic fuse, in conventional form may consist of a mechanical/hydraulic device in which the flow of fluid towards the brake causes a spool to move at a rate determined by factors including the pressure difference between an inlet and an outlet port and which closes when an assumed quantity of fluid (derived from the functional characteristics of the fuse) has flowed through the fuse.

Such systems involve costly and heavy hydraulic/mechanical devices, and it is one object of the present invention to provide a simplified cheaper and lighter system.

According to the invention, a hydraulic system comprises a flow control valve of the kind in which an effective orifice is presented as a known function of an input signal, an electronic processor arranged to provide an input signal in response to a demand signal to effect control of the flow control valve, an electrical pressure transducer arranged to sense the pressure of the output of fluid from the flow control valve and to provide an input to the processor, said processor including means for integrating with respect to time a function of the input signal to the flow control valve and the pressure of the output of fluid, and to effect comparison of the value of said integrated function with a predetermined value and to effect closure of the flow control valve if said comparison indicates a substantial fluid loss.

Figure 2:
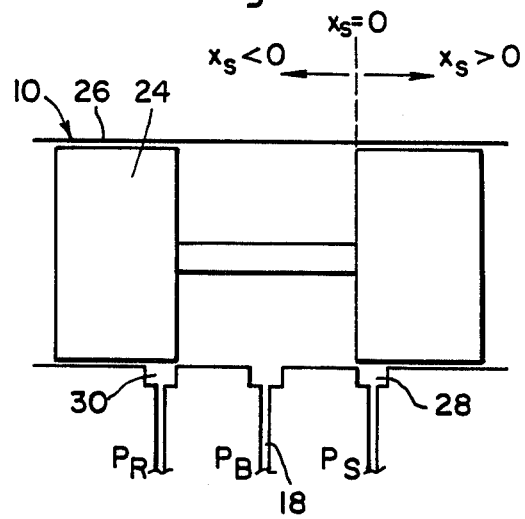

One embodiment of the invention will now be described, with reference to the accompanying drawings, in which FIG. 1 is a block schematic diagram of a portion of an aircraft braking system, indicating the operation of the invention in controlling the pressure of fluid supplied to a single brake, and FIG. 2 is a diagrammatic cross-section through a flow control valve.

A pressure source $P_S$ and a pressure reservoir $P_R$ are connected to a flow control servo valve 10. The flow of fluid (at a rate dV/dt) to a brake 12 is controlled by a signal (electrical current I) from a digital electronic processor 14 which is arranged to receive a pressure demand signal 16 from a pilot-operated control (not shown) and an anti-skid signal 17 from a wheel speed sensor (not shown) or associated skid-control system.

An output line 18 through which brake operating fluid is supplied from the flow control valve 10 is provided with a pressure transducer 20, connected to the line 18 adjacent to the valve 10 which transmits to the processor 14 a signal proportional to the pressure of brake fluid supplied by the valve 10.

The rate of flow (dV)/dt of fluid between the valve 10 and the brake 12 is a function of the input current I, the pressure of fluid at source $P_S$, the reservoir pressure $P_R$ and the pressure $P_B$ in the line to the brake. Conveniently, the valve 10 has an effective orifice which has a linear relationship with the input signal I.

Thus, $$dV/dt = f(I, P_S, P_R, P_B)$$

and integrating $$V = \int \frac{dV}{dt} dt = \int f(I, P_S, P_R, P_b) dt$$

where
dV/dt=Flow rate
V=Volume
I=Input current signal to flow control valve 10
$P_S$=Supply pressure
$P_R$=Reservoir pressure
$P_B$=Brake pressure A suitable flow control valve, of a type which is well-known in hydraulic systems, comprises a spool 24 which is movable in a cylinder 26 by a sevro system (not shown), under the control of a torque motor (not shown) through which the input current signal I is passed. An orifice 28 is progressively uncovered by the spool 24 when it moves to the right (FIG. 2) as the current I increases, and the effective size of the orifice is proportional to the distance $x_s$ moved by the spool along the cylinder from the mean position where the orifice is just fully closed.

Conversely, if the current I is reversed the spool 24 is moved progressively to the left from the means position ($x_s=0$) shown in FIG. 2, so that $x_s$ becomes negative, the orifice 28 is covered by the spool, sealing off the supply pressure $P_S$ from the brake, and the pressure $P_B$ in the brake operating mechanism is released via the orifice 30 which leads to the reservoir.

The effective area of either the orifice 28 or the orifice 30 is equal to w. $x_s$ where w is the valve orifice area gradient, and $x_s$ is the spool displacement.

Thus the resulting rate of flow of fluid to the brake, dV/dt is given by the equations:

$$\frac{dV}{dt} = C_d \, w \, x_s \sqrt{\frac{2}{\rho} (P_S - P_B)} \quad \text{for } x_s \geq 0 \quad (1)$$

and $$\frac{dV}{dt} = C_d \, w \, x_s \sqrt{\frac{2}{\rho} (P_B - P_R)} \quad \text{for } x_s < 0 \quad (2)$$

where
$\rho$ is the fluid mass density,
$x_s = k.I$ where k is the valve spool position/input current coefficient, and
$C_d$ is the valve orifice discharge coefficient.

It may be assumed that, for given values of $P_S$ and $P_R$, the quantity V of fluid which has passed into the line 18 will be a direct function of I, $P_B$ and time. By provision of suitable pre-set comparison and logic circuits in the processor 14 the processor can be programmed to operate the valve 10 so as to cut off the supply of fluids from the line 18 when the quantity V (as determined in the processor 14 by integration with respect to time of the values of dV/dt derived from equations (1) and (2) above) exceeds a predetermined value and thus indicates a leakage in the brake or its connecting line 18.

The system described above eliminates the need for costly, heavy, hydraulic fuses and provides an accurate and reliable safety measure against hydraulic fluid loss. The substitution of a flow control valve for the usual pressure control valve also provides savings in cost and a reduction in system complexity.

Having now described my invention, what I claim is:

1. A hydraulic system comprising a flow control valve of the kind in which an effective orifice is presented as a known function of an input signal, an electronic processor arranged to provide an input signal in response to a demand signal to effect control of the flow control valve, an electrical pressure transducer arranged to sense the pressure of the input of fluid from the flow control valve and to provide an input to the processor, said proessor including means for integrating with respect to time a function of the input signal to the flow control valve and the pressure of the output of fluid and to effect comparison of the value of said integrated function with a predetermined value and to effect closure of the flow control valve if said comparison indicates a substantial fluid loss.

2. A hydraulic system according to claim 1 wherein the effective orifice has a linear relationship with the input signal.

3. A hydraulic braking system according to claim 1.

4. A hydraulic braking system according to claim 1 wherein an anti-skid signal is provided to the processor.

* * * * *

UNITED STATES PATENT AND TRADEMARK OFFICE
CERTIFICATE OF CORRECTION

PATENT NO. : 4,775,195
DATED : October 4, 1988
INVENTOR(S) : Richard John MILLER It is certified that error appears in the above-identified patent and that said Letters Patent is hereby corrected as shown below:

Column 2, line 32, "sevro" should read --servo--.

Column 2, line 42, "means" should read --mean--.

Column 3, line 6, "fluids" should read --fluid--.

Column 4, line 5, "input" should read --output--.

Signed and Sealed this

Fourth Day of July, 1989

Attest:

DONALD J. QUIGG

Attesting Officer

Commissioner of Patents and Trademarks